United States Patent
Greco

(10) Patent No.: US 10,749,327 B2
(45) Date of Patent: Aug. 18, 2020

(54) UTILITY POLE WITH TILT METERS AND RELATED METHODS

(71) Applicant: San Diego Gas & Electric Company, San Diego, CA (US)

(72) Inventor: Paul Greco, San Diego, CA (US)

(*) Notice: Subject to any disclaimer, the term of this patent is extended or adjusted under 35 U.S.C. 154(b) by 232 days.

(21) Appl. No.: 16/020,044

(22) Filed: Jun. 27, 2018

(65) Prior Publication Data

US 2018/0375316 A1    Dec. 27, 2018

Related U.S. Application Data

(60) Provisional application No. 62/525,599, filed on Jun. 27, 2017.

(51) Int. Cl.
*G01C 9/06* (2006.01)
*H02G 7/20* (2006.01)

(52) U.S. Cl.
CPC ............... *H02G 7/20* (2013.01); *G01C 9/06* (2013.01)

(58) Field of Classification Search
CPC .............. H02G 7/20; G01C 9/04; G01C 9/06
USPC .......................................... 33/366.11–366.14
See application file for complete search history.

(56) References Cited

U.S. PATENT DOCUMENTS

| | | | |
|---|---|---|---|
| 5,488,777 A * | 2/1996 | Erdesky | G01C 1/00 33/280 |
| 7,392,593 B2 * | 7/2008 | Rivers | E06C 7/003 182/18 |
| 10,564,728 B1 * | 2/2020 | Vasudevan | G06F 3/016 |
| 2002/0011004 A1 * | 1/2002 | Ashjaee | G01C 9/06 33/366.24 |
| 2010/0095539 A1 * | 4/2010 | Nakaniwa | G01C 15/00 33/284 |
| 2011/0012728 A1 * | 1/2011 | McCane | G01S 5/0027 340/539.1 |
| 2014/0237833 A1 * | 8/2014 | Schubert | G01C 9/06 33/365 |
| 2018/0100323 A1 * | 4/2018 | Burbank | E04H 12/24 |
| 2020/0018290 A1 * | 1/2020 | Egedal | G01C 9/06 |

* cited by examiner

*Primary Examiner* — George B Bennett
(74) *Attorney, Agent, or Firm* — Klein, O'Neill & Singh, LLP

(57) ABSTRACT

A utility pole assembly includes an elongated structure and sensors mounted on the elongated structure for detecting and determining deflection and/or tilt. The elongated structure has a first end configured to be fixed into a ground and a second end that is free and located opposite the first end. A first sensor is positioned on the elongated body at or near the second end, and a second sensor is positioned on the elongated body between the first tilt sensor and the first end of the elongated body. The first and second sensors each include sensor circuitry configured for measuring movements in tilt values in at least two axes, which can be converted to tilt angles. The first and second tilt sensors, in combination, are configured for determining and distinguishing between elastic deflection of the elongated body and tilt of the elongated body.

23 Claims, 4 Drawing Sheets

UTILITY POLE WITH TILT METERS AND RELATED METHODS

FIELD OF ART

The present disclosure is generally directed to utility poles and related methods and more particularly to utility poles with meters and related methods for sensing the status and conditions of the utility poles.

BACKGROUND

Electricity is typically transmitted through overhead power lines supported by utility poles. These utility poles may also support other public utility lines, such as cable lines and telephone lines, and related equipment such as street lights, service lights, transformers, and transmitters. Besides supporting the public utility lines, the utility poles keep the overhead power lines and other electrical lines insulated from the ground and away from the reach of people. Downed poles can pose a hazard to people's safety and nearby property, including electrocution, fire, structural damage to surrounding structures and buildings, and power and utility outage, which can cause lost revenue and imposed fines.

Weather conditions and the ground for supporting a utility pole are factors in the design and construction of the utility pole. Over time, the performance of the utility pole may change. In one example, the age and deteriorating conditions of the pole, such as rot or stress fractures, can impact the deflection of the utility pole during high winds. Over time, the utility poles may fracture or snap when the load on the pole exceeds the structural integrity of the pole. In another example, soil movement at the foundation of the utility pole may cause the pole to tilt and/or shift at its base, which can further cause the utility pole to topple over and/or snap. Some utility poles can experience both pole deterioration and soil or ground movement.

Utility poles are typically inspected periodically to determine to determine their conditions and health status to then evaluate which of the poles need to be repaired or replaced. In some cities, the utility poles are required to be inspected every five years. Inspections of the utility poles are typically conducted when weather conditions permit. This allows inspectors or field technicians to safely inspect the utility poles. For example, inspecting the utility poles during a major windstorm would be unsafe and assessing the pole's condition quite difficult. Thus, a majority conventional inspections occur when the structural pole strength is not stressed or lightly stressed and may not reflect the most accurate data.

In high risk areas, such as in areas of extreme weather conditions or highly populated areas, the frequency of inspections can increase. The frequency between inspections can be driven in part by the sheer number of utility poles, the manpower needed to carry out the inspection, and the costs to inspect each utility pole. Between inspections, many events can occur affecting the utility poles.

SUMMARY

The various embodiments of utility poles have several features, no single one of which is solely responsible for their desirable attributes. Without limiting the scope of the present embodiments as set forth in the claims that follow, their more prominent features now will be discussed briefly.

According to an aspect of the present disclosure, a utility pole assembly can comprise a utility pole with two or more tilt meters or sensors spaced apart on the utility pole. The utility pole can be any number of commercially available utility poles. The tilt sensors can be selected with a single axis of rotation or multiple axes of rotation.

Movement experienced by the tilt sensor can produce a voltage output, or an analog signal, corresponding to a tilt angle. By positioning the tilt sensors at different altitudes along a length of the utility pole, the measured tilt angles from the tilt sensors at their respective known locations can be used to determine the deflection of the utility pole and/or the tilt or inclination of the utility pole.

The condition of the utility poles can be determined by periodically or continuously monitoring the tilt angle measurement data produced by the two or more tilt sensors.

When tilt angle measurements from the tilt sensors show that the utility pole is deflecting more than expected for a given current wind condition, that information may indicate potential imminent failure of the utility pole.

When tilt angle measurements from each of the tilt sensors are approximately the same, that information may indicate that the soil or ground surface in which the utility pole is planted may have shifted thereby causing the utility pole to tilt towards a side such that the utility pole is no longer vertical.

The utility pole can comprise an elongated body, which comprises a base portion and an exposed upright portion. Said differently, the utility pole can comprise an elongated body (e.g., an elongated pole) having a first end configured to be anchored or placed into the ground and a second end opposite the first end. The second end can be considered a free end, free from any rigid support or structure, excluding utility lines.

The base portion can comprise the portion of the elongated body between the first end and a ground surface. The upright portion can comprise the portion of the elongated body between the second end of the utility pole and the ground surface. A height of the utility pole can be defined as the distance from the ground surface to the second end of the utility pole.

The elongated body of the utility pole can have a fixed length or an overall length measured between the first end and the second end. A portion of the length of the elongated body fixed into the ground can be considered the base portion and the remaining portion of the length of the elongated body can be considered the upright portion.

The shape of the elongated body of the utility pole can be in the form of a cylindrical column with or without a taper. The tapered cylindrical column can have a decreasing circumference in a direction from the first end to the second end. The utility pole may also embody a number of different shapes and designs, such as a triangular structure, and can be multi-sided or polygonal in cross-section.

The utility pole can be made of a single homogenous material with substantially the same material properties throughout the utility pole, or formed with different material properties along a length of the utility pole. The utility pole can be made of a homogenous material such as wood, metal, or concrete, or a composite material comprising of any combination of materials.

The upright portion can extend 25 feet to 120 feet up from the ground surface. The base portion of the utility pole can extend a few feet to 6 feet or more into the ground or into the soil to support the weight of the utility pole and the equipment supported by the utility pole in an upright position.

The utility pole can have a first tilt meter or sensor located at or near the top of the utility pole and a second tilt meter or sensor located below the first tilt sensor between the first tilt sensor and the ground surface.

The first tilt sensor can be positioned at or near the second end of the elongated body and the second tilt sensor can be positioned between the first tilt sensor and the first end of the elongated body.

While the two tilt sensors can be located next to one another and the resolutions of the employed tilt sensors capable of measuring and distinguishing two measured points on the utility pole, the two tilt sensors can be spaced from one another so that deflection of the elongated body is more pronounced and measurements of the deflection easier to discern.

The first tilt sensor and the second tilt sensor can be mounted on an outer surface of the utility pole or embedded partially or entirely inside the utility pole.

The first tilt sensor and the second tilt sensor may be installed on the utility pole prior to installing the utility pole at an installed location, or the first tilt sensor and the second tilt sensor may be fitted onto an existing utility pole already installed at an installed location.

The second tilt sensor may be identical to or be different from the first tilt sensor. For example, the first tilt sensor may be a single axis tilt sensor with a certain resolution while the second tilt sensor can be a multi-axis tilt sensor with greater resolution.

Exemplary tilt sensors usable for detecting pole tilt conditions can include standard off the shelf accelerometers, gyroscopes, tilt sensors, and any combination of measuring and sensing devices, which may be attached at various locations on the utility pole, or packaged together in an assembly.

The first tilt sensor measures movement experienced by the first tilt sensor with respect to a vertical or starting position utilizing sensor circuitries configured for measuring movement along one, two, or three axes and outputting electric signals or data that can then be converted to tilt angles relative to a reference point.

The second tilt sensor can measure movement experienced by the second tilt sensor with respect to a vertical or starting position by utilizing sensor circuitries configured for measuring movement along one, two, or three axes and outputting electric signals or data that can then be converted to tilt angles relative to a reference point.

From the measured tilt angles of the first tilt sensor and the second tilt sensor, the amount of tilt and/or deflection of the utility pole can be determined.

By measuring the tilt angle of the first and the second tilt sensors and knowing where the first and the second tilt sensors are located along the length of the utility pole, the amount of deflection and tilt can be determined at different points along the length of the utility pole, whether the tilt is linear, is variable, or both.

The measured tilt angle data of the first and the second tilt sensors can provide a profile of the utility pole to determine any tilting or deflection that the utility pole may experience for a given weather condition, such as during a wind storm.

Historical data of the tilt measurements measured by the two tilt sensors can be stored in a memory. Over time, changes in the tilt angle data measured by the first and the second tilt sensors compared to the historical data for the same tilt sensors can indicate where along the utility pole and/or the soil deterioration has occurred and how much deterioration has progressed.

The combination of the first tilt sensor and the second tilt sensor can be used to distinguish an elastic/inelastic deflection of the utility pole from a tilt of the utility pole caused by movement of the base portion in the soil foundation. Additional tilt sensors may be provided along the length of the utility pole to increase tilt sensor data fidelity and provide a more informative profile of the conditions of the utility pole.

A redundant tilt sensor may also be placed at the same height as the first or the second tilt sensor or both to record additional tilt angle data or serve as a backup in the event the first or second tilt sensor fails.

The first tilt sensor and the second tilt sensor may each include an accelerometer such as a single axis accelerometer, a 2-axis accelerometer or a 3-axis accelerometer to measure the tilt angle. The first tilt sensor and the second tilt sensor may each include, in combination with the accelerometer, one or more gyroscopes to eliminate measurement errors arising from external accelerations, such as rapid movement, vibration, and shock.

The first tilt sensor and the second tilt sensor may each be packaged with any number of other sensors, such as a GPS sensor, an e-compass, a thermometer, a wind speed meter, a strain gauge, or any other measurement devices. Other sensor types may be used aside from accelerometer type sensors, including liquid capacitive, electrolytic, gas bubble in liquid, and pendulum type sensors.

The resolution and sensitivity of the sensors can be identical or different. In one example, because the first tilt sensor is located at the second end of the utility pole, the first tilt sensor may experience the greatest deflection. Therefore, the resolution of the first tilt sensor may not need to be as fine as the second tilt sensor and the sensitivity of the first tilt sensor may be less sensitive than the second tilt sensor.

The sensitivity and resolution of the first and second tilt sensors may also be selected and/or adjusted depending on the location of the utility pole. For example, in high risk areas where the population density is large, the resolution and sensitivity of the first and second tilt sensors can be improved. In areas where high winds are common, the resolution and sensitivity of the first and second tilt sensors may be reduced to avoid monitoring and recording tilt angle data continuously.

The sensitivity of the sensors can be controlled so that tilt angles from the sensors are not recorded and/or transmitted until a predetermined threshold tilt angle is surpassed.

In an original state with no wind or other forces acting on the utility pole, the sensors may each measure an initial tilt angle of zero degree, which indicates there is no tilt of the utility pole and the utility pole is in a vertical upright position.

If the initial tilt angle measured is not at zero degrees, the sensors can be repositioned (e.g., rotated) on the utility pole until a zero degree reading is obtained from each of the sensors, the readings or measurements of the initial tilt angle of the sensors can be electronically zeroed out by software, or the initial tilt angle can be left alone and treated as the initial readings for the two sensors.

After the initial tilt angle or baseline value has been established for each sensor, any deviation from the initial tilt angle can be measured by the first and second tilt sensors relative to the initial tilt angle. Any deviation from the baseline value as measured by the sensors indicates that the utility pole is bending or the foundation, such as the soil, to which the base portion of the elongated body is embedded has shifted causing the utility pole to tilt.

If the sensors each measure a tilt angle value that is different from their respective initial tilt angles and different from one another's readings during deflection of the utility pole, and the tilt angle data measured by the two sensors return measurements that are approximately the same as the initial tilt angles, then the utility pole has undergone an elastic deflection or elastic deformation.

Knowing the length of the upright portion of the utility pole, the location of the tilt sensors on the upright portion, the moment of inertia of the utility pole, and the modulus of elasticity of the utility pole, the amount of deflection can be determined for the measured tilt angles. A greater tilt angle can indicate a greater deflection experienced by the utility pole. Increasing the number of tilt sensors mounted on the upright portion can provide an increasingly accurate profile of the deflection of the utility pole.

If the measured tilt angle is greater than a predetermined threshold tilt angle, the information can be interpreted as significant deterioration of the utility pole indicating that further immediate inspection of the utility pole is needed.

An alarm can be provided or mounted on the utility pole to indicate that the predetermined threshold tilt angle has been exceeded. The alarm can be a light, a speaker or a siren emitting an audible sound, or a transmission to a nearby station, control room, or service vehicle to indicate that immediate attention may be needed.

A remote alarm may be provided at the nearby station, control room, or service vehicle to indicate that data has been received indicating the utility pole has tilted past the predetermined threshold tilt angle.

Tracking software with built-in analytics may be utilized to trigger the alarm 16 when tilt angle measurements exceed predetermined threshold tilt angle or other parameters, or when certain set conditions are met.

Data indicating the predetermined threshold tilt angle has been exceeded may also be stored in a memory, which may be accessed during utility pole inspections.

In one example, an inspector or field technician may simply plug directly (or indirectly) into the sensors to quickly determine the condition of the utility pole. For simplicity, the inspector may receive an initial diagnostic signal from memory indicating simply whether or not the utility pole has exceeded the predetermined threshold tilt angle or other parameter. Accompanying the tilt angle measurement data may include the time of day of the year or weather condition at time of measurement, such as wind speed.

If the deflection of the utility pole does not return to its initial upright position prior to deflection, the sensors may measure tilt angles that are different than the initial tilt angles or baseline data for the two sensors prior to the deflection, which indicate an inelastic or partially inelastic deformation of the utility pole has occurred.

If the measured tilt angle of the sensors are substantially identical, this can indicate one of two possible utility pole conditions: (1) either the base portion located in the ground has shifted or (2) the utility pole as experienced a failure below the second tilt sensor.

If the initial tilt angle has shifted past a predetermined initial tilt angle threshold, that information can be interpreted as deterioration of the utility pole and/or movement of the soil foundation.

A secondary alarm can be provided on the utility pole to indicate that the predetermined threshold initial angle has been exceeded. The secondary alarm can be a light, a speaker or a siren emitting an audible sound, or a transmission to a nearby station, control center, or service vehicle to indicate that immediate attention may be needed.

The secondary alarm can be incorporated in the first alarm by using different sounds, light colors, etc. to indicate the different conditions that have been exceeded.

The second tilt sensor placed along the length or height of the utility pole between the first tilt sensor and the ground surface can enable tracking and determination of tilt of the utility pole with greater accuracy and pertinent information than for a single tilt sensor application.

If the tilt angle measured by the first tilt sensor is greater than the tilt angle measured by the second tilt sensor, and the readings from the two sensors return to at least close to their baseline values after the conditions that caused the deflection subside, an elastic deformation had occurred.

If both the first tilt sensor and the second tilt sensor register approximately the same reading, the two measurements signify that the utility pole is not bending but that the ground or soil is shifting causing the utility pole to tilt or that a section of the utility pole below the second sensor has sustained damage.

The measured tilt angle data of the first tilt sensor and the second tilt sensor can determine whether the utility pole is undergoing deflection, tilting due to soil movement at the foundation of the utility pole, or tilting due to damage sustained to the elongated body at a point below the second sensor.

The tilt angle measured by the first tilt sensor and the second tilt sensor can determine where along the length of the utility pole deformation is occurring.

The two tilt sensors can be identical to one another. Each tilt sensor can include a housing and a measurement module located inside the housing. The housing may be a clamshell type housing with a seal around a perimeter of an opening of one clamshell half so that when the two clamshell halves are joined together to close, the seal prevents moisture from entering into an interior cavity of the housing.

Each housing can be made of a hard plastic shell with or without a seal around a perimeter of an opening to prevent moisture and contaminants from entering the housing. The material of each housing may instead be a metal material.

The measurement module in each housing can include one or more accelerometers to sense and measure tilt angle with respect to gravity vertical reference point. One or more gyroscopes, and/or other sensing and measuring devices may be included in combination with or instead of the one or more accelerometers to measure the tilt angle.

Each housing may also contain at least one processor connected directly or indirectly to an output of the measuring module for processing tilt angle data, a memory module connected to an output of the processor and/or output of the measurement module for storing tilt angle data, and a communication module connected to an output of a processor and/or an output of the memory module for transmitting the tilt angle data.

The first tilt sensor and the second tilt sensor can be connected to each other by a hard wire connection or a wireless connection such as Bluetooth®, Wi-Fi, NFC, or other communication protocols.

At least one of the first tilt sensor and the second tilt sensor may house a processor, a memory module, and/or a communication module to process, record, and transmit the tilt angle data from the measurement modules of both the first tilt sensor and the second tilt sensor.

The tilt angle measured by the first tilt sensor and the second tilt sensor can be recorded continuously or periodically. In high risk areas or areas subject to wet or extreme weather conditions, the frequency of measuring and/or recording sensor movements can increase.

Over time the dynamic and static tilt angle measurements of the first tilt sensor and the second tilt sensor can reveal a deterioration or deformation of the utility pole, movement of the utility pole within the soil foundation, or a combination of both a deterioration of the utility pole and tilt of the utility pole caused by soil movement.

To save energy, at least one of the first tilt sensor and the second tilt sensor may be operational until a tilt past a certain tilt angle is detected and measured, at which time the second tilt sensor may be activated to measure tilt angle data as well.

The tilt angle data measured by the measurement module can be periodically or continuously processed by the processor and recorded into the memory module.

The tilt angle data measured by the measurement module can be transmitted wirelessly, using the communications module to a receiver or remote server at a nearby station, control center, or a service vehicle.

The tilt angle data may also be downloaded from the sensors by a service technician connecting directly to the sensors via a hard wire connection or a wireless connection such as Bluetooth®, Wi-Fi, NFC, or other communication protocols.

The processor the memory module, and the communication module may be located inside the housing of each sensor. Alternatively, the processor, the memory module, and the communication module may be located inside the housing of just one of the tilt sensors in which case, the tilt sensor having the processor, the memory module, and the communication module can process, record, and transmit the data from the measurement modules of both the first tilt sensor and the second tilt sensor.

The communications module comprises a transmitter to transmit the recorded data from the memory or the tilt angle data can be transmitted in real time from the measurement module by wireless communication to a receiver or server at a nearby station or control center.

The transmitter may be a transceiver capable of not only transmitting tilt angle data but receiving control data from the nearby station to diagnose and/or control the modules and/or components in the sensors.

The receiving data may comprise of instructions to change the rate of data transmission between periodic and continuous measurement and/or recording.

If the transceiver antenna of the communications module is located inside the housing, the material of the housing may be a material that does not block transmission and reception of signals via the transceiver antenna.

A material of the housing, may serve as the antenna, or the antenna may be located outside of the housing or extend outside of the housing.

Data may be transmitted and received by a physical electrical line supported by the utility pole.

The sensors may draw power from a power module comprising a rechargeable battery located inside the housing and connected to the measurement module, the processor, and the communications module. The rechargeable battery can be a rechargeable lithium ion battery. The rechargeable battery may be charged by a solar panel connected to the rechargeable battery.

The power module may include a transformer connected between a power line or other electrical line supported by the utility pole and the rechargeable battery to power the rechargeable battery. The sensors may draw power directly from the power line via the transformer, in which case the rechargeable battery serves as a backup power supply in the event power supplied to the sensors through the power line is severed.

To save energy, some or all of the components of the sensors may be activated when movement (e.g. deflection, tilt, etc.) of the utility pole past a predetermined threshold activation angle is encountered to save energy.

The sensitivity of the components of the measurement modules of the sensors may be adjusted to eliminate recording vibrations or small movements. Once movement past a predetermined threshold activation angle is reached, the sensors can come online to begin measuring the tilt angles to avoid recording or transmitting information when there are no issues with the utility pole. The sensors may be activated remotely or manually.

The first tilt sensor mounted at or near the tip of the utility pole, away from the first end, may experience the greatest movement seen by the utility pole to be sensed and measured.

The first tilt sensor can produce tilt angle data corresponding to movement, converted to a tilt angle of the first tilt sensor. Other measurements can be included in the tilt angle data including recording positions of the first tilt sensor and/or second sensors or other points on the utility pole using a GPS device.

The second tilt sensor can be mounted some distance along the upright portion of the utility pole between the first tilt sensor and the ground, and produce tilt angle data corresponding to the tilt angle of the second tilt sensor.

The second tilt sensor may be located along the upright portion of the utility pole at a height halfway between the first tilt sensor and the ground, or at a height of two thirds the distance between the first tilt sensor and the ground.

The second tilt sensor can provide tilt angle data, which can be correlated with the tilt angle data taken by the first tilt sensor. The tilt angle data of the second tilt sensor can also include a position of the second tilt sensor.

A ratio of the first set of data with respect to the second set of data greater than unity (e.g., 1) indicates either a deflection of the upright portion of the utility pole or a deformation of the upright portion of the utility pole. If the change in tilt angle measured at the first sensor is greater than the change in tilt angle measured at the second sensor, then a deflection or deformation can be determined. If at least one of the tilt angles of the first tilt sensor and the second tilt sensor does not return back to their respective initial tilt angles before the deflection or deformation has occurred, then the utility pole can be construed as having undergone plastic/permanent deformation.

By knowing the change in tilt angle in the first tilt sensor and the second tilt sensor and the current wind conditions, the general location of the deformation can be better determined.

When the utility pole remains somewhat straight or linear but movement is caused by the soil, a ratio of the first set of data with respect to the second set of data should approach unity (e.g., 1).

If the change in angle measured at the first tilt sensor is about the same as the second tilt sensor, then a tilt of the pole can be determined indicating that the soil foundation of which the base portion is embedded has shifted or may be loose. If the tilt of the utility pole (e.g., the tilt angles of the first and second sensors), does not return back to its initial tilt angle and is larger than another predetermined threshold tilt angle, then immediate attention may be required.

An alarm can be provided on the utility pole, or transmitted remotely to a control center or station, to indicate that the other predetermined threshold tilt angle has been exceeded. The alarm can be a light, a speaker or siren emitting an audible sound, or transmission to a nearby station or service vehicle or field technician to indicate that immediate attention may be needed.

The first and second data indicating the predetermined threshold tilt angle has been exceeded may be stored in a memory, which can be downloaded and processed during utility pole inspections by inspectors or field technicians. Accompanying the first and second data may also be accompanied with other data including the time of day and the weather conditions during the time of measurement, such as wind speed.

The data measured and determined from the sensors may also be used in pole calculations to determine the pole capacity. Other calculations of the utility pole may include decrease in strength, available service life, shift, tilt, damage, etc.

To save cost and energy, the first and second tilt sensors may be placed on one or more utility poles for a given number of utility poles. Under this arrangement, it is assumed that the deformation of one of the utility poles represent a larger number of utility poles.

Although a utility pole is discussed for use with the tilt sensor, other tall structures may utilize a tilt sensor such as buildings and bridges.

Methods of using tilt sensors and of making tilt sensors to detect utility pole conditions are within the scope of the present invention.

According to another aspect of the present disclosure, a utility pole assembly with sensors for detecting and determining at least one of deflection and tilt of a utility pole, can comprise an elongated body having a first end configured to be fixed into a ground and a second end opposite the first end.

The utility pole assembly can further comprise a first tilt sensor positioned on the elongated body closer to the second end than the first end. The first tilt sensor can comprise sensor circuitry configured for measuring movements in first tilt values of the first tilt sensor in at least two axes. The first tilt values can correspond to at least tilt angles measured by the first tilt sensor.

The utility pole assembly can further comprise a second tilt sensor positioned on the elongated body between the first tilt sensor and the first end of the elongated body. The second tilt sensor can comprise sensor circuitry configured for measuring movements in second tilt values of the second tilt sensor in at least two axes. The second tilt values can correspond to at least tilt angles measured by the second tilt sensor.

The utility pole assembly can further comprise a first communications module for transmitting at least one of the first tilt values and the second tilt values.

The first and second tilt values of the first and second tilt sensors, in combination, can be utilized for determining and distinguishing between elastic deflection of the elongated body and tilt of the elongated body.

The utility pole assembly can further comprise a first memory module connected to the first communications module. The first memory module can be configured for storing at least one of the first tilt values and the second tilt values.

The first tilt values and the second tilt values can be transmitted wirelessly to a remote location.

The first tilt sensor can be located at or near the second end of the elongated body.

Each of the first tilt sensor and the second tilt sensor can comprise at least one accelerometer and at least one gyroscope.

Each of the first tilt sensor and the second tilt sensor further includes at least one of a GPS sensor, an e-compass, a thermometer, and a wind speed meter.

The second tilt sensor can be in wired communication with the first tilt sensor.

The second tilt sensor can be in wireless communication with the first tilt sensor.

The utility pole assembly can further comprise an alarm configured to trigger when at least one of the first tilt values measured by the first tilt sensor and the second tilt values measured by the second tilt sensor is greater than a predetermined threshold value.

The utility pole assembly can further comprise a first housing and a second housing, wherein the first tilt sensor is located in the first housing, the second tilt sensor is located in the second housing, and the first housing and the second housing are each made of a hard material to shield components inside the first housing and the second housing, respectively.

The utility pole assembly can further comprise a first memory module and a first processor, wherein at least one of the first memory module and the first processor is connected to the first tilt sensor.

The first communications module can be connected to at least one of the first processor, the first memory module, and the first tilt sensor.

The first communications module can transmit the first tilt values wirelessly.

The first communications module can also transmit the second tilt values wirelessly.

The utility pole assembly can further comprise a second memory module and a second processor, wherein at least one of the second memory module and the second processor is connected to the second tilt sensor.

The utility pole assembly can further comprise a second communications module to transmit the second tilt values.

The second communications module can be connected to at least one of the second processor, the second memory module, and the second tilt sensor.

The second communications module can transmit the second tilt values wirelessly.

Aspects of the present disclosure also includes a method of detecting and determining at least one of deflection and tilt of an elongated structure having a first end fixed to a ground and a second end opposite the first end. A first tilt sensor can be positioned on the elongated structure. A second tilt sensor can be positioned between the first tilt sensor and the first end of the elongated structure. The method can comprise acquiring a first set of data from the first tilt sensor, the first set of data corresponding to at least tilt angles measured by the first tilt sensor.

The method can further comprise acquiring a second set of data from the second tilt sensor, the second set of data corresponding to at least tilt angles measured by the second tilt sensor.

The method can further comprise determining, from the first set of data and the second set of data, whether the elongated structure has at least one of deflected and tilted.

The first set of data can comprise first measured values, and the second set of data can comprise second measured values.

The determining of whether the elongated structure has at least one of deflected and tilted can comprise indicating that the elongated structure has tilted if a difference between the first measured values and the second measured values fall within a predetermined tolerance range, and either the first measured values and the second measured values are greater than a predetermined initial tilt angle threshold.

The determining of whether the elongated structure has at least one of deflected and tilted can further comprise indicating that the elongated structure has deflected if the difference between the first measured values and the second measured values is greater than the predetermined tolerance range.

Another aspect of the present disclosure includes a utility pole detection system, utilizing at least two sensors for detecting and determining at least one of deflection and tilt of an elongated structure assembly, can comprise an elongated structure having a first end fixed to a ground and a second end opposite the first end.

The system can further comprise a first tilt sensor positioned on the elongated structure, the first tilt sensor being configured for measuring tilt angles of the first tilt sensor and outputting first tilt values corresponding to the tilt angles measured by the first tilt sensor.

The system can further comprise a second tilt sensor positioned between the first tilt sensor and the first end of the elongated structure. The second tilt sensor can be configured for measuring tilt angles of the second tilt sensor and outputting second tilt values corresponding to the tilt angles measured by the second tilt sensor.

The system can further comprise an alarm configured to trigger when at least one of the first tilt values and the second tilt values are greater than a predetermined threshold value.

The alarm can be mounted on the elongated structure.

The alarm can emit a light or produces an audible sound when the alarm is triggered.

The alarm can be located at a remote station.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments of utility poles with sensors provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

As used herein, the terms "vertical" and "vertically upright position", and similar directional terms, are understood to be with reference to the ground, and the terms "tilt," "tilted position," and "tilted upright", and similar orientation terms, refer to a direction or a position at an angle relative to the ground. Similarly, the terms "top," "bottom," "above," and "below" indicate positions relative to a given point or element. For example, a top of the utility pole is at a higher altitude or height than a bottom of the utility pole and therefore the top, elevation-wise, is located above the bottom of the utility pole.

Figure 1:
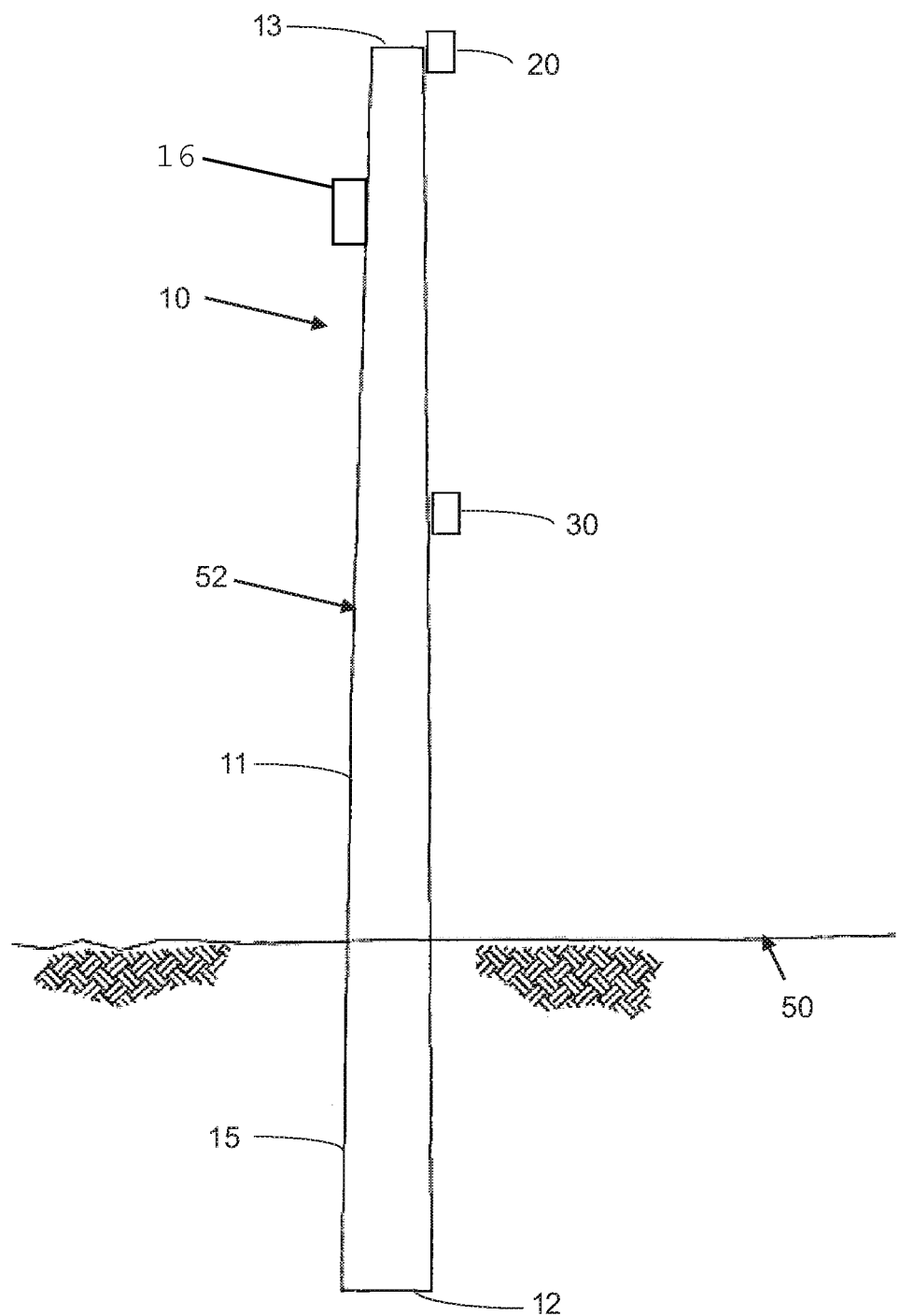
FIG. 1 is a schematic elevation view of a utility pole assembled with a first and a second tilt sensor along a length of the utility pole.

FIG. 1 is a schematic depiction of a utility pole 10 with two or more tilt meter or sensor assemblies 20, 30 mounted thereon in a spaced apart relationship. The utility pole 10 can be any number of commercially available utility poles. Each of the tilt sensor assemblies 20, 30 comprises one or more tilt sensors 29, 39 (see FIG. 2). The tilt sensors 29, 39 usable with the present invention are configured to measure the movement experienced by the respective tilt sensors 29, 39 that can then be converted to a tilt angle, or to values that are indicative of how much tilt the tilt sensors have experienced or undergo from a first or initial position or from a prior measured position. For example, a typical tilt sensor can produce a voltage output that can then be converted to tilt angle, of some defined range, such as +/−45 degrees from vertical. The tilt sensors 29, 39 can be selected with a single axis of rotation or multiple axes of rotation. By positioning the tilt sensor assemblies 20, 30 comprising one or more sensors at different altitudes or heights along a length of the utility pole 10, the measured tilt angles from the tilt sensors 29, 39 at their respective known locations can be used to determine the deflection of the utility pole 10 (see FIG. 3) and/or the tilt or inclination of the utility pole 10 (see FIG. 4). By utilizing at least two tilt sensors mounted at two different heights along the length of the utility pole 10, the amount of pole movement due to bending as well as soil or ground movement can both be detected, tracked, and acted on to avoid critical failure or to learn from so that the failure mode can be accounted for in future planning.

The condition of the utility poles 10 can be determined by periodically or continuously monitoring the tilt angle measurement data produced by the two tilt sensor assemblies 20, 30. In some examples, there can be more than two tilt sensor assemblies 20, 30 positioned along a length of the utility pole 10 in spaced apart arrangements. As further discussed below, empirical data and/or calculated data can provide expected deflection characteristics for each of the tilt sensor assemblies 20, 30 mounted at predetermined heights or locations on a utility pole. In other examples, historical data may be used as base line acceptable deflection values and used to compare against measured values. Thus, when tilt angle measurements from the tilt sensor assemblies 20, 30 show that the utility pole 10 is deflecting more than expected for a given current wind condition, that information may indicate potential imminent failure of the utility pole 10 and on-site inspection and/or work repair may be warranted. In another example, tilt angle measurements from each of the tilt sensor assemblies 20, 30 that fall approximately on a straight line may indicate that the soil or ground surface in which the utility pole 10 is planted may have shifted thereby causing the utility pole 10 to tilt towards a side such that the utility pole 10 is no longer vertical. In still other examples, the utility pole can experience both deflection due to wind conditions as well as soil or ground surface movement. The deflection and tilt of the utility pole 10 will be discussed further below with reference to FIGS. 3 and 4.

With reference again to FIG. 1, the utility pole 10 is vertical and in an upright position relative to the ground 50. The utility pole 10 can be considered substantially vertical or in an upright position after installation of the utility pole 10 into the ground, which can mark a starting or base line point of the utility pole. The utility pole supports the weight of the overhead lines and equipment, which is distributed down the length of the utility pole 10. In other words, the weight of the equipment and lines exert a compressive force on the utility pole. If the utility pole 10 is not properly anchored or supported, the utility pole has deteriorated, the soil below the ground supporting the utility pole has shifted, and/or wind conditions are causing the utility pole 10 to tilt, the utility pole 10 can tilt in a falling or tilting direction, usually the direction with the least resistance or the direction that is being induced by external forces.

When the utility pole 10 is no longer vertical, the weight of the equipment and lines supported by the utility pole may force the utility pole 10 to bend, thereby introducing bending stresses to the utility pole 10 and lateral forces in the soil supporting the utility pole 10 to further loosen the soil. The deflection and/or angular deviation of the utility pole 10 from the vertical upright position can be monitored from the tilt angle measurement data produced by the tilt sensor assemblies 20, 30. In other examples, the utility pole 10 may also be installed and maintained at an angle for other purposes, in which case the tilt sensor assemblies 20, 30 can similarly be used to monitor angular deviations of the utility pole 10 from the pre-tilted conditions for those other purposes.

With continued reference to FIG. 1, the utility pole 10 comprises an elongated body 52, which comprises a base portion 15 and an exposed upright portion 11. Said differently, the utility pole 10 can comprise an elongated body 52 (e.g., an elongated pole) having a first end 12 configured to be anchored or placed into the ground and a second end 13 opposite the first end 12. The second end 13 can be considered a free end, free from any rigid support or structure, excluding utility lines. The base portion 15 can comprise the portion of the elongated body 52 between the first end 12 and a surface of the ground 50 (e.g., ground level). The upright portion 11 can comprise the portion of the elongated body 52 between the second end 13 of the utility pole 10 and the ground surface 50. A height of the utility pole 10 can be defined as the distance from the ground surface 50 to the second end 13 of the utility pole 10.

The elongated body 52 of the utility pole 10 has a fixed length or an overall length measured between the first end 12 and the second end 13. Part of the elongated body 52 near the second end 13 can be called sections or portions of the pole near the second end, which is understood to be located further away from the first end than the second end. Part of the elongated body 52 near the first end 12 can be called sections or portions of the pole near the first end, which is understood to be located further away from the second end than the first end. A portion of the length of the elongated body 52 fixed into the ground can be considered the base portion 15 and the remaining portion of the length of the elongated body 52 can be considered the upright portion 11. Thus, the length of the base portion 15 and the upright portion 11 together can account for the entire length of the elongated body 52. The upright portion 15 of the utility pole 10 can transition from the base portion 11. In another example, the utility pole 10 comprises an elongated body comprising a plurality of portions including a base portion 15 located in the ground or below the ground surface 50 and an upright portion 15 located above the ground.

The shape of the elongated body 52 of the utility pole 10 can be in the form of a cylindrical column with or without a taper. As shown in the illustrated embodiment, the elongated body 52 is a tapered cylindrical column with a decreasing circumference from the first end 12 to the second end 13. The utility pole 10 can also embody a number of different shapes and designs, such as a triangular structure, and can be multi-sided or polygonal in cross-section. The utility pole 10 can be made of a homogenous material such as wood, metal, or concrete, or a composite material comprising of any combination of materials. Whatever the material used, the utility pole 10 should have sufficient strength, structural integrity, and durability to support, among other things, cross beams, power lines, telephone lines, other electrical lines, lights, transformers, transmitters, and/or other electrical equipment insulated from the ground and away from the reach of people. In the exemplary embodiment of FIG. 1, the utility pole 10 is made of a single homogenous material with substantially the same material properties throughout the utility pole 10. The utility pole 10 may also be formed with different material properties along a length of the utility pole 10. In some instances, one or more tilt sensors can be mounted on a cross beam or to an equipment or a structure that is then mounted to the utility pole or to a cross beam.

The upright portion 11 can extend 25 feet to 120 feet up from the ground surface 50. The base portion 15 of the utility pole 10 can extend a few feet to 6 feet or more into the ground or into the soil to support the weight of the utility pole 10 and the equipment supported by the utility pole 10 in an upright position. In some instances, the base portion 15 can be anchored into the ground, such as by a concrete footing or foundation. The stability of the foundation in which the base portion 15 of the utility pole 10 is embedded into is important to ensure that the utility pole 10 and the electrical equipment mounted on the upright portion 11 of the utility pole 10, such as onto cross beams mounted to the upright portion 11 of the utility pole, remain in a vertically upright position, preferably orthogonal to the ground surface, and away from a person's reach.

The utility pole 10 shown in FIG. 1 is equipped with a first tilt meter or sensor assembly 20 located at or near the top of the utility pole 10 and a second tilt meter or sensor assembly 30 is located below the first tilt sensor assembly 20 between the first tilt sensor assembly 20 and the ground surface 50. That is, the first tilt sensor assembly 20 is positioned at or near the second end 13 of the elongated body 52 and the second tilt sensor assembly 30 is positioned between the first tilt sensor assembly and the first end 12 of the elongated body 52. In some instances, the first tilt sensor assembly 20 being positioned at or near the second end 13 can include being mounted to a cross beam or to a structure that is then mounted to the utility pole 10 near the second end 13. In still other examples, the first tilt sensor assembly 20 can be mounted to a first cross beam and the second tilt sensor assembly 30 can be mounted to a second cross beam, which is located below the first cross beam.

While the two tilt sensor assemblies 20, 30 can be located next to one another and the resolutions of the employed tilt sensor assemblies capable of measuring and distinguishing two measured points on the utility pole, the two tilt sensor assemblies are preferably spaced from one another so that deflection, if any, of the elongated body 52 is more pronounced and measurements of the deflection easier to discern. In an example, the two sensors can be mounted at least two (2) inches from one another, with one being located higher, elevation-wise, than the other. In other examples, the two sensors are located at least one foot, elevation-wise, from one another.

The first tilt sensor assembly 20 and the second tilt sensor assembly 30 can be mounted on an outer surface of the utility pole 10 or embedded partially or entirely inside the utility pole 10. The first tilt sensor assembly 20 and the second tilt sensor assembly 30 may be installed on the utility pole 10 prior to installing the utility pole 10 at an installed location, or the first tilt sensor assembly 20 and the second tilt sensor assembly 30 may be fitted onto an existing utility pole 10 already installed at an installed location.

The second tilt sensor assembly 30 may be identical to or be different from the first tilt sensor assembly 20. For example, the first tilt sensor assembly 20 may be a single axis tilt sensor assembly with a certain resolution while the second tilt sensor assembly 30 can be a multi-axis tilt sensor assembly with greater resolution. Exemplary tilt sensor assemblies usable for detecting pole tilt conditions can include standard off the shelf accelerometers, gyroscopes, tilt sensors, and any combination of measuring and sensing devices, which may be attached at various locations on the utility pole 10, or packaged together in an assembly. The first tilt sensor assembly 20 measures movement experienced by the first tilt sensor assembly 20 with respect to a vertical or starting position utilizing sensor circuitries configured for measuring movement along one, two, or three axes and outputting electric signals or data that can then be converted to tilt angles relative to a reference point. The second tilt sensor assembly 30 can also measure movement experienced by the second tilt sensor assembly 30 with respect to a vertical or starting position by utilizing sensor circuitries configured for measuring movement along one, two, or three axes and outputting electric signals or data that can then be converted to tilt angles relative to a reference point.

From the measured tilt angles of the first tilt sensor assembly 20 and the second tilt sensor assembly 30, the amount of tilt and/or deflection, and possibly translational movement due to ground movement, of the utility pole 10 can be determined. More specifically, by measuring the tilt angle of the first and the second tilt sensor assemblies 20, 30 and knowing where the first and the second tilt sensor assemblies 20, 30 are located along the length of the utility pole 10, the amount of deflection and tilt can be determined at different points along the length of the utility pole 10, whether the tilt is linear, is variable, or both. The measured tilt angle data of the first and the second tilt sensor assemblies 20, 30 can provide a profile of the utility pole 10 to determine whether any tilting or deflection that the utility pole may experience for a given weather condition, such as during a wind storm or following an earthquake.

Historical data can be kept of the tilt measurements measured by the at least two tilt sensor assemblies 20, 30. Over time, changes in the tilt angle data measured by the first and the second tilt sensor assemblies 20, 30 compared to the historical data for the same tilt sensor assemblies can indicate where along the utility pole 10 and/or the soil deterioration has occurred and how much deterioration has progressed. Moreover, the combination of the first tilt sensor assembly 20 and the second tilt sensor assembly 30 can be used to distinguish an elastic/inelastic deflection of the utility pole 10 from a tilt of the utility pole 10 caused by movement of the base portion 11 in the soil foundation, as will be discussed in detail below with reference to FIGS. 3 and 4. Additional tilt sensor assemblies may be provided along the length of the utility pole 10 to increase tilt sensor data fidelity and provide a more informative profile of the conditions of the utility pole 10. A redundant tilt sensor assembly may also be placed at the same height as the first or the second tilt sensor assembly or both to record additional tilt angle data or serve as a backup in the event the first or second tilt sensor assembly fails.

The first tilt sensor assembly 20 and the second tilt sensor assembly 30, hereinafter also referred to as sensor assemblies 20, 30, may each include an accelerometer such as a single axis accelerometer, a 2-axes accelerometer or a 3-axis accelerometer to measure the tilt angle, as discussed below with reference to FIG. 2. The sensor assemblies 20, 30 can include, in combination with the respective accelerometer, one or more gyroscopes to eliminate measurement errors arising from external accelerations, such as rapid movement, vibration, and shock. The sensor assemblies 20, 30 may also be packaged with any number of other sensors, such as a GPS sensor, an e-compass, a thermometer, a wind speed meter, a strain gauge, or any other measurement devices. Other sensor types may be used aside from accelerometer types, including liquid capacitive, electrolytic, gas bubble in liquid, and pendulum type sensors.

The resolution and sensitivity of the two or more tilt sensor assemblies 20, 30 can be identical or different. For example, because the first tilt sensor assembly 20 is located at the free end (i.e., second end 13) of the utility pole 10, the first tilt sensor assembly 20 would experience the greatest deflection. Therefore, the resolution of the first tilt sensor assembly 20 may not need to be as fine as the second tilt sensor assembly 30 and the sensitivity of the first tilt sensor assembly 20 may be less sensitive than the resolution and/or sensitivity of the second tilt sensor assembly 30. The sensitivity and resolution of the first and second tilt sensor assemblies 20, 30 may also be selected and/or adjusted depending on the location of the utility pole 10. For example, in high risk areas where the population density is large, the resolution and sensitivity of the first and second tilt sensor assemblies 20, 30 can be improved. In areas where high winds are common, the resolution and sensitivity of the first and second tilt sensor assemblies 20, 30 may be reduced to avoid monitoring and recording tilt angle data continuously. Thus, the sensitivity of the tilt sensor assemblies 20, 30 can be controlled so that tilt angles from the sensor assemblies 20, 30 are not recorded and/or transmitted until a predetermined threshold tilt angle is surpassed.

The tilt angle measurements first measured by the sensor assemblies 20, 30 when installed on the utility pole 10 or when the utility pole 10 is installed on site represent the initial or baseline tilt angle measurements. For example, in an original state with no wind or other forces acting on the utility pole 10, the sensor assemblies 20, 30 may each measure an initial tilt angle of zero degree, which indicates there is no tilt of the utility pole 10 and the utility pole 10 is in a vertical upright position. In one embodiment, if the initial tilt angle measured is not at zero degrees, the sensor assemblies 20, 30 can be repositioned (e.g., rotated) on the utility pole 10 until a zero degree reading is obtained from each of the sensor assemblies 20, 30. In another embodiment, the readings or measurements of the initial tilt angle of the sensor assemblies 20, 30 can be electronically zeroed out. For example, if the initial tilt angle data measured by the sensor assemblies 20, 30 is something other than zero degree, then the initial tilt angle of each of the sensor assemblies 20, 30 can be changed to zero degree by resetting the sensor assemblies 20, 30 by software rather than repositioning the sensor assemblies 20, 30. In yet another embodiment, the initial tilt angle can be left alone and treated as the initial readings for the two sensors, such as 2 degrees for each sensor, and recorded as baseline or initial tilt angles for subsequent sensor measurements to base against. Any deviation from the baseline data as measure by the sensor assemblies 20, 30 indicates that the utility pole 10 is bending (see FIG. 3) or the foundation, such as the soil, to which the base portion 15 of the elongated body 52 is embedded has shifted causing the utility pole to tilt (see FIG. 4) beyond the initial values.

After the initial tilt angle or baseline value has been established for each of the sensor assemblies 20, 30, any deviation from the initial tilt angle can be measured by the first and second tilt sensor assemblies 20, 30 relative to the initial tilt angle. In one example, if the utility pole 10 undergoes a deflection caused by a side load, such as the wind, applied to the utility pole 10 and the utility pole 10 returns back to its initial state prior to the deflection caused by the side load, the utility pole 10 can be determined to have undergone an elastic deflection or elastic deformation. In this example, the sensor assemblies 20, 30 would each measure a different tilt angle value that is different from their respective initial tilt angle and different from one another's readings during deflection of the utility pole 10. When the wind conditions subside, the tilt angle data measured by the two sensor assemblies 20, 30 would return measurements that are approximately the same as the initial tilt angles, which are approximately the same as the baseline values, indicating that the utility pole 10 has undergone an elastic deflection or elastic deformation.

A greater tilt angle can indicate a greater deflection experienced by the utility pole 10. Knowing the length of the upright portion 11 of the utility pole 10, the location of the tilt sensor assemblies 20, 30 on the upright portion 11, the moment of inertia of the utility pole 10, and the modulus of elasticity of the utility pole 10, the amount of deflection can be determined for the measured tilt angles. Moreover, increasing the number of tilt sensor assemblies mounted on the upright portion 11, such as three or more tilt sensor assemblies, including four, six, or more, can provide an increasingly accurate profile of the deflection of the utility pole 10. An increasing amount of deflection for a given condition over time, such as for a given wind speed measurable by an anemometer or other wind speed measurement devices, can indicate deterioration or other issues with the utility pole 10. This is especially important after a storm in which the foundation in which the utility pole 10 is located and the utility pole 10 itself can be affected by the external environmental conditions. For example, if the measured tilt angle is greater than a predetermined threshold tilt angle, the information can be interpreted as significant deterioration of the utility pole 10 indicating that further immediate inspection of the utility pole 10 is needed.

An alarm 16 can be provided or mounted on the utility pole 10 to indicate that the predetermined threshold tilt angle has been exceeded. The alarm 16 can be a light, a speaker or a siren emitting an audible sound, or a transmission to a nearby station, control room, or service vehicle to indicate that immediate attention may be needed, or combinations thereof. A remote alarm may be provided at the nearby station, control room, or service vehicle to indicate that data has been received indicating a utility pole 10 has tilted past the predetermined threshold tilt angle. Tracking software with built-in analytics may be utilized to trigger the alarm 16 when tilt angle measurements exceed predetermined threshold tilt angle or other parameters, or when certain set conditions are met. The system and the software can track multiple utility poles 10 that have tile sensor assemblies mounted thereon for measuring utility pole tilt of the various utility poles.

Data indicating that a predetermined threshold tilt angle has been exceeded may also be stored in a memory, which may be accessed during utility pole inspections. In one example, a signal, such as a light, is provided at a control room or at the utility pole to be inspected indicating that some threshold value for the particular utility pole has been exceeded. In an example, the threshold value is a maximum tilt angle set point value set by an inspector or overseer of the pole inspection task. The signal can indicate that the particular utility pole is a candidate for further inspection and/or evaluation. An inspector or field technician, based on the signal, can then plug an analytic device, such as a laptop, a tablet, a proprietary analytic handheld device, etc., directly (or indirectly, such as via wireless connection) into the sensors to determine the condition of the utility pole 10. For simplicity, the inspector may receive an initial diagnostic signal from memory indicating simply whether or not the utility pole has exceeded the predetermined threshold tilt angle or other parameter. Accompanying the data may also include the time of day of the year or weather condition at time of measurement, such as wind speed. The collected data can be synchronized to local weather database so as to correlate the collected data with the weather conditions on the date(s) of collections. In one example, a pole inspector may visit utility poles 10 in known trouble spots and interface with the memory to quickly determine whether the utility poles 10 have tilted past the predetermined threshold tilt angle.

If the deflection of the utility pole 10 is not perfectly elastic (e.g., inelastic), that is, if the utility pole 10 does not return to its initial upright position prior to deflection, then the sensor assemblies 20, 30 would measure tilt angles that are different than the initial tilt angles or baseline data for the two sensor assemblies 20, 30 prior to the deflection. That is, if the measurements of the sensor assemblies 20, 30 do not return to their initial tilt angle reference points or values, an analyst can conclude that an inelastic or partially inelastic deformation of the utility pole 10 has occurred. The change in the initial tilt angle reference points may generally indicate that the utility pole 10 has deteriorated, such as a crack that prevents the pole from returning to its initial position.

If the measured tilt angle of the sensor assemblies 20, 30 are substantially identical, such as 14 degrees for each recorded measurement, this can indicate one of two possible utility pole conditions: (1) either the base portion 15 located in the ground has shifted or (2) the utility pole has experienced a failure below the second tilt sensor assembly 30, as described in detail further below. In one example, if the initial tilt angle has shifted past a predetermined initial tilt angle threshold, that information can be interpreted as deterioration of the utility pole 10 and/or movement of the soil foundation indicating that further immediate inspection of the utility pole 10 is needed, as described in more detail below.

A secondary alarm, similar to the alarm 16 located on the utility pole or remotely for indicating that a predetermined threshold tilt angle has been exceeded, can be provided on the utility pole 10 to indicate that the predetermined threshold initial angle has been exceeded. The secondary alarm can be a light, a speaker or a siren emitting an audible sound, or a transmission to a nearby station, control center, or service vehicle to indicate that immediate attention may be needed, or combinations thereof. Alternatively, the secondary alarm can be incorporated in the same alarm as the first alarm 16 by using different sounds, light colors, etc. to indicate the different conditions that have been exceeded.

The second tilt sensor assembly 30 placed along the length or height of the utility pole 10 between the first tilt sensor assembly 20 and the ground surface 50 enables tracking and determination of tilts of the utility pole 10 with greater accuracy and pertinent information than for a utility pole with a single tilt sensor application. Moreover, new and useful information can be gained by adding a second or additional tilt sensor assemblies that were not foreseen by using just one tilt sensor application. As discussed briefly above, the second tilt sensor assembly 30 in combination with the first tilt sensor assembly 20 can help an analyst or technician to accurately determine the condition of the utility pole 10 during the deflection, after the conditions that caused the deflection have subsided, and/or where along the utility pole deformation may have occurred. For example, if the utility pole 10 deflects due to high wind conditions, the tilt angle measured by the first tilt sensor assembly 20 will be greater than the tilt angle measured by the second tilt sensor assembly 30 due to the utility pole's 10 natural bending with a fixed base portion 15. This type of deflection is preferred so long as the readings from the two sensor assemblies 20, 30 return to or are close to their baseline values after the conditions that caused the deflection subside. However, if both the first tilt sensor assembly 20 and the second tilt sensor assembly 30 register approximately the same reading, such as a reading of 20 degrees from vertical, the two measurements signify that the utility pole 10 is not bending but that the ground or soil is shifting or that a section of the utility pole below the second sensor assembly 30 has sustained damage. That is, the utility pole 10 has tilted due to movement of the base portion 11 in the ground soil. Thus, the second tilt sensor assembly 20 in combination with the first tilt sensor assembly 10 can help determine the tilt versus deflection of the utility pole 10 more accurately and precisely than a single tilt sensor application. Additional tilt sensors may be provided along the length of the utility pole 10, in addition to the two sensor assemblies 20, 30, to better monitor the dynamic characteristics of the utility pole 10 over time and the conditions of the utility pole along finite length sections of the utility pole 10.

Figure 3:
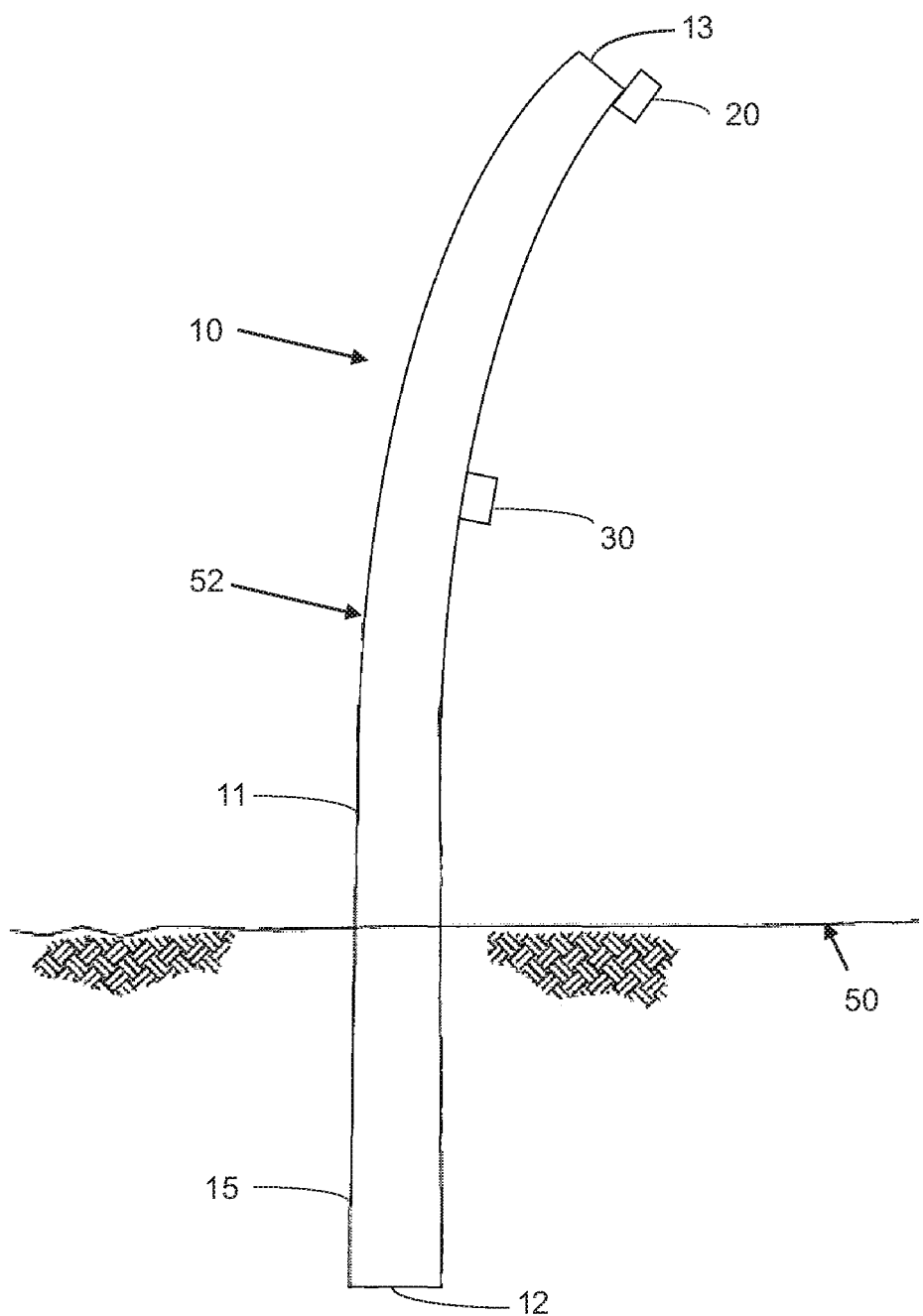
FIG. 3 is a schematic elevation view of the utility pole assembly of FIG. 1 shown in a deflected state.
Figure 4:
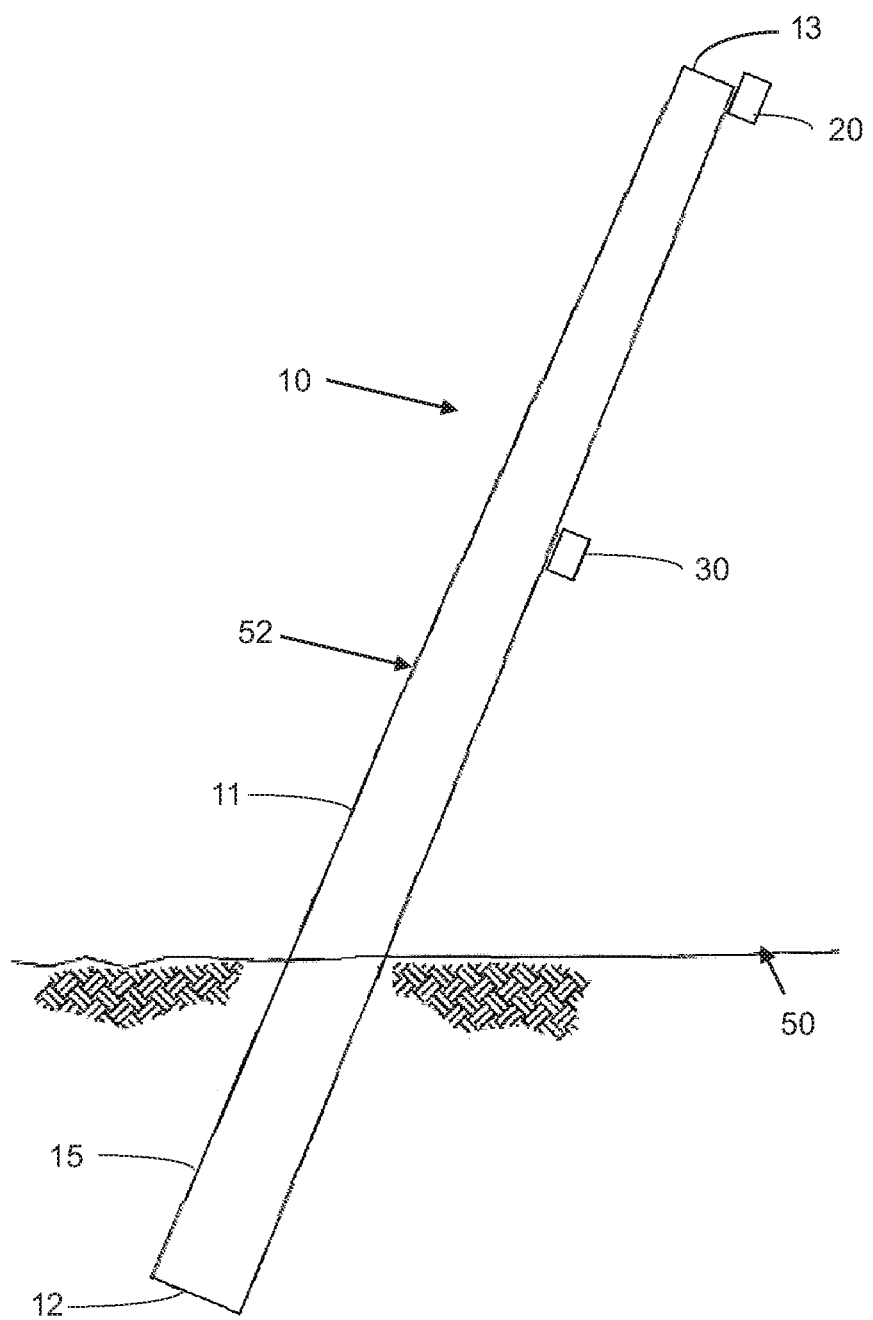
FIG. 4 is a schematic elevation view of the utility pole assembly of FIG. 1 shown in a tilted state.

The first tilt sensor assembly 20 and second tilt sensor assembly 30 can each measure tilt angle data at their respective positions along the length or height of the utility pole 10. The measured tilt angle data of the first tilt sensor assembly 20 and the second tilt sensor assembly 30 can determine whether the utility pole 10 is undergoing deflection as shown in FIG. 3 or tilting due to soil movement at the foundation of the utility pole 10, or due to damage sustained to the elongated body at a point below the second sensor, as shown in FIG. 4. Furthermore, the tilt angle measured by the first tilt sensor assembly 20 and the second tilt sensor assembly 30 can determine where along the length of the utility pole deformation is occurring. In still other examples, the tilt sensors can also detect both deflection and tilting. The measured data can show both values indicative of deflection and then shifting due to tilting.

Figure 2:
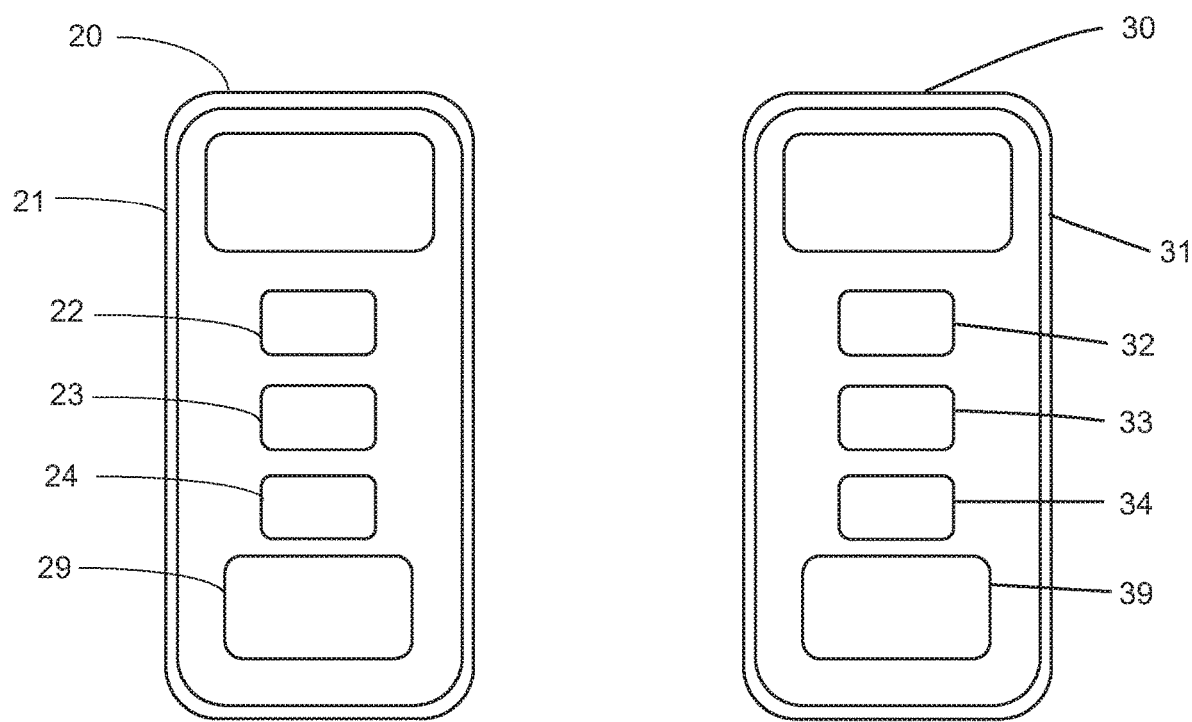
FIG. 2 is a schematic view of a first tilt sensor and a second tilt sensor, which can be the same of different.

With reference now to FIG. 2, exemplary first and second sensor assemblies 20, 30 are shown with additional sensor assemblies can be similarly configured. In an example, the two sensor assemblies 20, 30 can be identical to one another. Each of the sensor assemblies 20, 30 can include a housing 21, 31 and a tilt sensor 29, 39 located inside the housing 21, 31. Each housing 21, 31 can be made of a hard plastic shell with or without a seal around a perimeter of an opening to prevent moisture and contaminants from entering the housing 21, 31. In one example, the housing 21, 31 may be a clamshell type housing with a seal around a perimeter of an opening of one clamshell half so that when the two clamshell halves are joined together to close, the seal prevents moisture from entering into an interior cavity of the housing. Other modules and components may also be located inside the interior cavity of each housing 21, 31. The material of each housing 21, 31, may be other than plastic, such as a metal or a polymer material, so long as communication can be established to and/or from the tilt sensor 29, 39 inside the housing 21, 31, and the components inside the housing 21, 31 are protected from moisture, flying debris, and other contaminants.

The tilt sensor 29, 39 in each housing can include one or more accelerometers to sense and measure tilt angle with respect to gravity vertical reference point. One or more gyroscopes, and/or other sensing and measuring devices may be included in combination with or instead of the one or more accelerometers to measure the tilt angle. Each housing 21, 31 may also contain at least one processor 22, 32 connected directly or indirectly to an output of the tilt sensor 29, 39 for processing tilt angle data, a memory module 23, 33 connected to an output of the processor 22, 32 and/or output of the tilt sensor 29, 39 for storing tilt angle data, and a communications module 24, 34 connected to an output of a processor 22, 32 and/or an output of the memory module 23, 33 for transmitting the tilt angle data.

In an exemplary embodiment, the first tilt sensor assembly 20 and the second tilt sensor assembly 30 can be connected to each other by a hard wire connection or a wireless connection such as Bluetooth®, Wi-Fi, NFC, or other communication protocols. In this arrangement of connectivity, only one of the first tilt sensor assembly 20 and the second tilt sensor assembly 30 may house a processor, a memory module, and/or a communications module to process, record, and transmit the tilt angle data from the tilt sensors 29, 39 of both the first tilt sensor assembly 20 and the second tilt sensor assembly 30.

The tilt angles measured by the first tilt sensor assembly 20 and the second tilt sensor assembly 30 can be recorded continuously or periodically. In some examples, the measured tilt values are immediately displayed on a local display, such as on the screen of the respective tilt sensor assembly or a local screen connected to the tilt sensor assembly. In high risk areas or areas subject to wet or extreme weather conditions, the frequency of measuring and/or recording sensor movements can increase. Thus, the status of the utility pole 10 can be monitored for immediately or live feedback or for historical perspective over time by dynamic tilt angle measurements (e.g., tilt angle measurements from elastic deflections of the utility pole) and static tilt angle measurements (e.g., initial tilt angle measurements) taken by the first tilt sensor assembly 20 and the second tilt sensor assembly 30.

Over time the dynamic and static tilt angle measurements of the first tilt sensor assembly 20 and the second tilt sensor assembly 30 can reveal a deterioration or deformation of the utility pole 10, movement of the utility pole 10 within the soil foundation, or a combination of both a deterioration of the utility pole 10 and tilt of the utility pole 10 caused by soil movement. For example, the measurements can show the utility pole not returning to its starting position or acceptable threshold state, that for a given wind condition the utility pole defects or tilts more than a normal or average range, etc. To save energy, only the first tilt sensor assembly 20 may be operational until a tilt past a certain tilt angle is detected and measured, at which time the second tilt sensor assembly 30 may be activated to measure tilt angle data as well.

The tilt angle data measured by the tilt sensors 29, 39 can be periodically or continuously processed by the processors 22, 32 and recorded into the memory modules 23, 33 when both tilt sensor assemblies 20, 30 are operational. Alternatively, the tilt angle data measured by the tilt sensors 29, 39 can be transmitted wirelessly, using the communications modules 24, 34, to a receiver or remote server at a nearby station, control center, or a service vehicle. The tilt angle data may also be downloaded from the sensor assemblies 20, 30 by a service technician connecting directly to the sensor assemblies 20, 30 via a hard wire connection or a wireless connection such as Bluetooth®, Wi-Fi, NFC, or other communication protocols. The processor 22, 32, the memory module 23, 33, and the communications module 24, 34 may be located inside the housing of each tilt sensor assembly. Alternatively, the processor 22, 32, the memory module 23, 33, and the communications module 24, 34 may be located inside the housing of just one of the tilt sensor assemblies 20, 30 in which case, the tilt sensor assembly having the processor, the memory module, and the communications module can process, record, and transmit the data from the tilt sensors 29, 39 of both the first tilt sensor assembly 20 and the second tilt sensor assembly 30.

The communications module 24, 34 comprises a transmitter to transmit the recorded data from the memory 23, 33 or the tilt angle data can be transmitted in real time from the tilt sensors 29, 39 by wireless communication to a receiver or server at a nearby station or control center. The transmitter may be a transceiver capable of not only transmitting tilt angle data but receiving control data from the nearby station to diagnose and/or control the modules and/or components in the sensor assemblies 20, 30. In one example, the receiving data may comprise of instructions to change the rate of data transmission between periodic and continuous measurement and/or recording. The receiving data may include an executable file, or contains only an executable file, for updating the firmware or software for operating the tilt sensor assembly. If the transceiver antenna of the communications module 24, 34 is located inside the housing, the material of the housing 21, 31, may be a material that does not block transmission and reception of signals via the transceiver antenna. In some embodiments, a material of the housing 21, 31, may serve as the antenna. In other embodiments the antenna is located outside of housing 21, 31, or extends outside of the housing 21, 31. In yet other embodiments, data can be transmitted and received by a physical electrical line supported by the utility pole 10.

Each of the sensor assemblies 20, 30 may draw power from a power module 25, 35 comprising a rechargeable battery located inside the housing 21, 31 and connected to the tilt sensor 29, 39, the processor 22, 32, and the communications module 24, 34. In one example, the rechargeable battery can be a rechargeable lithium ion battery. The rechargeable battery may be charged by a solar panel connected to the rechargeable battery. The power module 25, 35 may also include a transformer connected between a power line or other electrical line supported by the utility pole 10 and the rechargeable battery to power the rechargeable battery. In one embodiment, the sensor assemblies 20, 30 may draw power directly from the power line via the transformer, in which case the rechargeable battery serves as a backup power supply in the event power supplied to the sensor assemblies 20, 30 through the power line is severed.

To save energy, some or all of the components of the sensor assemblies 20, 30, may be activated when movement (e.g. deflection, tilt, etc.) of the utility pole 10 past a predetermined threshold activation angle is encountered to save energy. More specifically, the components of the sensor assemblies 20, 30 may be activated when tilt angles measured by the tilt sensors 29, 39 reach predetermined threshold activation angles. The sensitivity of the components of the tilt sensors 29, 39 of the sensor assemblies 20, 30 may be adjusted to eliminate recording vibrations or small movements. Once movement past predetermined threshold activation angles are reached, the sensor assemblies 20, 30 can come online to begin measuring the tilt angles. This option can avoid recording or transmitting information when there are no issues with the utility pole 10. Alternatively, the sensor assemblies 20, 30 can be activated remotely or manually to begin measuring and recording. Furthermore, it is apparent to those skilled in the art that the term modules, as shown in FIG. 2 and described above, may also be software modules or software units instead of physical modules or physical units.

FIG. 3 shows a condition of the utility pole 10 under deflection caused by a horizontal load or a load that is applied to a side of the utility pole 10. In one example, a gust of wind can cause the deflection of the utility pole 10. In another example, a combination of wind and rain can cause the deflection of the utility pole 10. FIG. 4, on the other hand, shows a condition of the utility pole 10 in a tilted position caused by a shift in the ground or soil foundation. In the tilted position, the utility pole 10 forms an angle from its original upright vertical position, or possibly damage sustained by the utility pole. In one example, if the angle of tilt of the utility pole 10 has deviated from the upright position more than the predetermined threshold tilt angle, such as 10-30 degrees, then immediate attention to inspect the utility pole 10 may be warranted and an alarm 16 may be activated, locally or transmitted to a station or control center. Although not shown, the utility pole 10 may also be under deflection, such as being induced by high force winds, when in a tilted position.

With reference to both FIGS. 3 and 4, the first tilt sensor assembly 20 mounted at or near the tip of the utility pole 10, away from the first end 12, will experience the greatest movement by the utility pole 10 to be sensed and measured. The first tilt sensor assembly 20 produces tilt angle data corresponding to movement, converted to tilt angle, of the first tilt sensor assembly 20. Other measurements can be included in the tilt angle data including recording positions of the first tilt sensor assembly 20 and/or second sensor assembly 30 or other points on the utility pole using a GPS device. In some embodiments, the recorded data may be numerical values that are not converted to angle values. For example, a series of data may be transmitted by the tilt sensor assemblies 20, 30 and recorded as numbers that are than tracked for relative movements or deviations. Thus, the tilt sensor assembly can detect and transmit tilt values corresponding to at least tilt angles and the recording of said information can be numerical values, such as 2 or 2.5, representative of tilt angles or can be converted to equivalent tilt angles, such 6 degrees.

The second tilt sensor assembly 30 mounted some distance along the upright portion 15 of the utility pole 10 between the first tilt sensor assembly 20 and the ground, produces tilt angle data corresponding to the tilt angle of the second tilt sensor assembly 30. In one embodiment, the second tilt sensor assembly 30 is located along the upright portion 15 of the utility pole 10 at a height halfway between the first tilt sensor assembly 20 and the ground. In another embodiment, the second tilt sensor assembly 30 is located along the utility pole 10 at a height of two thirds the distance between the first tilt sensor assembly 20 and the ground. In other examples, the second tilt sensor assembly may be located anywhere along the utility pole that is about 6 inches below or greater than the first tilt sensor assembly and about one foot or higher than the ground. The second tilt sensor assembly 30 provides tilt angle data, which can be correlated with the tilt angle data taken by the first tilt sensor assembly 20. As in the first tilt sensor assembly 20, the tilt angle data of the second tilt sensor assembly 30 can also include a position of the second tilt sensor assembly 30.

With reference again to FIG. 3, when the utility pole 10 is deflected due to high wind conditions or due to deterioration of the utility pole 10, a ratio of the first set of data with respect to the second set of data greater than unity (e.g., 1) indicates either a deflection of the upright portion 15 of the utility pole 10 or a deformation of the upright portion 15 of the utility pole 10. For example, if the change in tilt angle measured at the first tilt sensor assembly 20 is greater than the change in tilt angle measured at the second tilt sensor assembly 30, then a deflection or deformation can be determined. If at least one of the tilt angles of the first tilt sensor assembly 20 and the second tilt sensor assembly 30 does not return back to their respective initial tilt angles before the deflection or deformation has occurred, then the utility pole can be construed as having undergone a plastic/permanent deformation.

Moreover, by knowing the change in tilt angle in the first tilt sensor assembly 20 and the second tilt sensor assembly 30 and the current wind conditions, the general location of the deformation can be better determined. For example, if the first tilt sensor assembly 20 measures a tilt angle that does not return back to its initial tilt angle, and the second tilt sensor assembly 30 measures a tilt angle that returns back to its initial tilt angle, then deformation of the utility pole 10 has occurred somewhere along the utility pole 10 between the first tilt sensor assembly 20 and the second tilt sensor assembly 30. In another example, if the first tilt sensor assembly 20 measures a tilt angle larger than expected given the measured wind conditions, but the second tilt sensor assembly 30 measures an expected tilt angle, then the portion of the utility pole 10 somewhere between the first tilt sensor assembly 20 and the second tilt sensor assembly 30 has deteriorated and that immediate attention should be given to closely monitor any potential failure of the utility pole 10 at that location along the utility pole 10 to avoid further damage. In yet another example, if high wind conditions are measured and both the first tilt sensor assembly 20 and the second tilt sensor assembly 30 measure tilt angles larger than expected given the measured wind conditions, then the portion of the utility pole 10 below the second tilt sensor assembly 30 may indicate that immediate attention should be given to closely monitor of any potential failure of the utility pole 10 to avoid further damage.

With reference again to FIG. 4, when the utility pole 10 remains somewhat straight or linear but movement is caused by the soil, a ratio of the first set of data with respect to the second set of data should approach unity (e.g., 1). That is, if the change in angle measured at the first tilt sensor assembly 20 is about the same as the second tilt sensor assembly 30, then a tilt of the pole can be determined indicating that the soil foundation of which the base portion is embedded has shifted or may be loose. Moreover, if the tilt of the utility pole 10 (e.g., the tilt angles of the first and second sensor assemblies 20, 30), does not return back to its initial tilt angle and is larger than another predetermined threshold tilt angle, then immediate attention may be required. In addition, an alarm 16 can be provided on the utility pole, or transmitted remotely to a control center or station, to indicate that the other predetermined threshold tilt angle has been exceeded. As described above, the alarm 16 can be a light, a speaker or siren emitting an audible sound, or transmission to a nearby station or service vehicle or field technician to indicate that immediate attention may be needed. Alternatively, the first and second data indicating the predetermined threshold tilt angle has been exceeded may be stored in a memory, which can be downloaded and processed during utility pole inspections by inspectors or field technicians. Accompanying the first and second data may also be accompanied with other data including the time of day and the weather conditions during the time of measurement, such as wind speed.

It may be understood that for either a deformation of the utility pole 10 or shifting in the soil foundation of the utility pole 10, the sensor assemblies 20, 30 may slowly drift away from its initial angle over time. Thus, in one embodiment, if the initial tilt angle over time has deviated too far from the original initial angle, and is past a predetermined threshold initial angle, than immediate attention should be warranted, and, as discussed above, an alarm 16 can be provided on the utility pole to alert of the condition. The data measured and determined from the sensor assemblies 20, 30 may also be used in pole calculations to determine the pole capacity. Other calculations of the utility pole 10 may include decrease in strength, available service life, shift, tilt, damage, etc.

To save cost and energy, the first and second tilt sensor assemblies 20, 30 may be placed on one or more utility poles for a given number of utility poles 10. Under this arrangement, it is assumed that the deformation of one of the utility poles 10 represent a larger number of utility poles. This arrangement may be applicable in areas of low risk. However, in areas of high risk or extreme weather conditions, the sensor assemblies 20, 30 may be placed on all of the utility poles 10 or at least in higher numbers than compared to remote low risk locations.

Although a utility pole 10 is discussed for use with the tilt sensor, other tall structures may utilize a tilt sensor such as buildings and bridges.

Methods of using tilt sensors and tilt sensor assemblies and of making tilt sensors and tilt sensor assemblies to detect utility pole conditions are within the scope of the present invention.

Although limited embodiments of the utility pole with tilt sensor assemblies have been specifically described and illustrated herein, many modifications and variations will be apparent to those skilled in the art. For example, the various utility poles with tilt sensor assemblies may incorporate other sensors and components to facilitate or improve determining the status and condition of the utility pole with tilt sensor assemblies. Furthermore, it is understood and contemplated that features specifically discussed for one utility pole with tilt sensor assemblies embodiment may be adopted for inclusion with another utility pole with tilt sensor assemblies embodiment, provided the functions are compatible. For example, the utility pole may be used in another embodiment shown with GPS sensors. Another example includes utility pole with strain gauges positioned on the utility pole 10. Accordingly, it is to be understood that the utility pole with tilt sensor assemblies and their components constructed according to principles of the disclosed device, system, and method may be embodied other than as specifically described herein. The disclosure is also defined in the following claims.

What is claimed is:

1. A utility pole assembly with sensors for detecting and determining at least one of deflection and tilt of a utility pole, the utility pole assembly comprising:
   an elongated body having a first end configured to be fixed into a ground and a second end opposite the first end;
   a first tilt sensor positioned on the elongated body closer to the second end than the first end, the first tilt sensor comprising sensor circuitry configured for measuring movements in first tilt values of the first tilt sensor in at least two axes, the first tilt values corresponding to at least tilt angles measured by the first tilt sensor;
   a second tilt sensor positioned on the elongated body between the first tilt sensor and the first end of the elongated body, the second tilt sensor comprising sensor circuitry configured for measuring movements in second tilt values of the second tilt sensor in at least two axes, the second tilt values corresponding to at least tilt angles measured by the second tilt sensor;
   a first communications module for transmitting at least one of the first tilt values and the second tilt values; and
   wherein the first and second tilt values of the first and second tilt sensors, in combination, are utilized for determining and distinguishing between elastic deflection of the elongated body and tilt of the elongated body.

2. The utility pole assembly of claim 1, further comprising a first memory module connected to the first communications module, said first memory module configured for storing at least one of the first tilt values and the second tilt values.

3. The utility pole assembly of claim 1, wherein the first tilt values and the second tilt values are transmitted wirelessly to a remote location.

4. The utility pole assembly of claim 1, wherein the first tilt sensor is located at or near the second end of the elongated body.

5. The utility pole assembly of claim 1, wherein each of the first tilt sensor and the second tilt sensor includes at least one accelerometer and at least one gyroscope.

6. The utility pole assembly of claim 5, wherein each of the first tilt sensor and the second tilt sensor further includes at least one of a GPS sensor, an e-compass, a thermometer, and a wind speed meter.

7. The utility pole assembly of claim 1, wherein the second tilt sensor is in wired communication with the first tilt sensor.

8. The utility pole assembly of claim 1, wherein the second tilt sensor is in wireless communication with the first tilt sensor.

9. The utility pole assembly of claim 1, further comprising an alarm configured to trigger when at least one of the first tilt values measured by the first tilt sensor and the second tilt values measured by the second tilt sensor is greater than a predetermined threshold value.

10. The utility pole assembly of claim 1, further comprising a first housing and a second housing, wherein the first tilt sensor is located in the first housing, the second tilt sensor is located in the second housing, and the first housing and the second housing are each made of a hard material to shield components inside the first housing and the second housing, respectively.

11. The utility pole assembly of claim 10, further comprising a first memory module and a first processor, wherein at least one of the first memory module and the first processor is connected to the first tilt sensor.

12. The utility pole assembly of claim 11, wherein the first communications module is connected to at least one of the first processor, the first memory module, and the first tilt sensor.

13. The utility pole assembly of claim 12, wherein the first communications module transmits the first tilt values wirelessly.

14. The utility pole assembly of claim 13, wherein the first communications module also transmits the second tilt values wirelessly.

15. The utility pole assembly of claim 12, further comprising a second memory module and a second processor, wherein at least one of the second memory module and the second processor is connected to the second tilt sensor.

16. The utility pole assembly of claim 15, further comprising a second communications module to transmit the second tilt values, wherein the second communications module is connected to at least one of the second processor, the second memory module, and the second tilt sensor.

17. The utility pole assembly of claim 16, wherein the second communications module transmits the second tilt values wirelessly.

18. A method of detecting and determining at least one of deflection and tilt of an elongated structure having a first end fixed to a ground and a second end opposite the first end, a first tilt sensor positioned on the elongated structure, a second tilt sensor positioned between the first tilt sensor and the first end of the elongated structure, the method comprising:
   acquiring a first set of data from the first tilt sensor, the first set of data corresponding to at least tilt angles measured by the first tilt sensor;
   acquiring a second set of data from the second tilt sensor, the second set of data corresponding to at least tilt angles measured by the second tilt sensor; and
   determining, from the first set of data and the second set of data, whether the elongated structure has at least one of deflected and tilted.

19. The method of claim 18, wherein the first set of data comprises first measured values, and the second set of data comprises second measured values; wherein the determining of whether the elongated structure has at least one of deflected and tilted comprises:
   indicating that the elongated structure has tilted if a difference between the first measured values and the second measured values fall within a predetermined tolerance range, and either the first measured values and the second measured values are greater than a predetermined initial tilt angle threshold; and
   indicating that the elongated structure has deflected if the difference between the first measured values and the second measured values is greater than the predetermined tolerance range.

20. A utility pole detection system utilizing at least two sensors for detecting and determining at least one of deflection and tilt of an elongated structure assembly, the system comprising:
   an elongated structure having a first end fixed to a ground and a second end opposite the first end;
   a first tilt sensor positioned on the elongated structure, the first tilt sensor being configured for measuring tilt angles of the first tilt sensor and outputting first tilt values corresponding to the tilt angles measured by the first tilt sensor;
   a second tilt sensor positioned between the first tilt sensor and the first end of the elongated structure, the second tilt sensor being configured for measuring tilt angles of the second tilt sensor and outputting second tilt values corresponding to the tilt angles measured by the second tilt sensor; and an alarm configured to trigger when at least one of the first tilt values and the second tilt values are greater than a predetermined threshold value.

21. The system of claim 20, wherein the alarm is mounted on the elongated structure.

22. The system of claim 20, wherein the alarm emits a light or produces an audible sound when the alarm is triggered.

23. The system of claim 20, wherein the alarm is located at a remote station.

* * * * *